United States Patent
Jung et al.

(10) Patent No.: US 7,876,791 B2
(45) Date of Patent: Jan. 25, 2011

(54) SYNCHRONIZING APPARATUS AND METHOD IN PACKET NETWORK

(75) Inventors: Hong-kyu Jung, Daejeon-si (KR); Fei Fei Feng, Yongin-si (KR); Geoffrey M. Garner, Red Bank, NJ (US); Byung-suk Kim, Uiwang-si (KR); Chul-ki Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 146 days.

(21) Appl. No.: 12/178,715

(22) Filed: Jul. 24, 2008

(65) Prior Publication Data

US 2010/0020909 A1   Jan. 28, 2010

(51) Int. Cl.
*H04J 3/06* (2006.01)
(52) U.S. Cl. .................... 370/503; 370/345
(58) Field of Classification Search ............... 370/503, 370/507, 508, 509, 510, 512, 516, 517, 518, 370/519, 345, 350
See application file for complete search history.

(56) References Cited

U.S. PATENT DOCUMENTS

| | | | |
|---|---|---|---|
| 6,891,881 B2 * | 5/2005 | Trachewsky et al. | 375/143 |
| 6,975,655 B2 * | 12/2005 | Fischer et al. | 370/516 |
| 7,000,031 B2 * | 2/2006 | Fischer et al. | 709/248 |
| 7,092,408 B1 * | 8/2006 | Isaksen | 370/503 |
| 7,535,822 B2 * | 5/2009 | Geile et al. | 370/208 |
| 2001/0038674 A1 * | 11/2001 | Trans | 375/355 |
| 2004/0062278 A1 * | 4/2004 | Hadzic et al. | 370/503 |
| 2006/0268893 A1 | 11/2006 | Lataretu | |
| 2006/0269029 A1 * | 11/2006 | Repko et al. | 375/356 |
| 2006/0280182 A1 * | 12/2006 | Williams et al. | 370/394 |
| 2007/0025470 A1 | 2/2007 | Nee et al. | |
| 2007/0217524 A1 | 9/2007 | Wang et al. | |

FOREIGN PATENT DOCUMENTS

| | | |
|---|---|---|
| KR | 10-2006-0069220 | 6/2006 |
| KR | 10-2007-0048648 | 5/2007 |

* cited by examiner

*Primary Examiner*—Chi H. Pham
*Assistant Examiner*—Kevin Mew
(74) *Attorney, Agent, or Firm*—NSIP Law

(57) ABSTRACT

Provided are a synchronizing apparatus and method for performing synchronization in a packet network. The synchronizing apparatus includes a sampling unit to measure a time difference using a plurality of time stamps included in a plurality of two-way message packets, an estimating unit to estimate a frequency offset by applying a baseline algorithm to the time difference, a verifying unit to verify the frequency offset to remove an error caused by network delay variation, and a synchronizing unit to remove the frequency offset from a local slave clock signal and generate a slave clock signal synchronized to a clock signal of a master device.

15 Claims, 8 Drawing Sheets

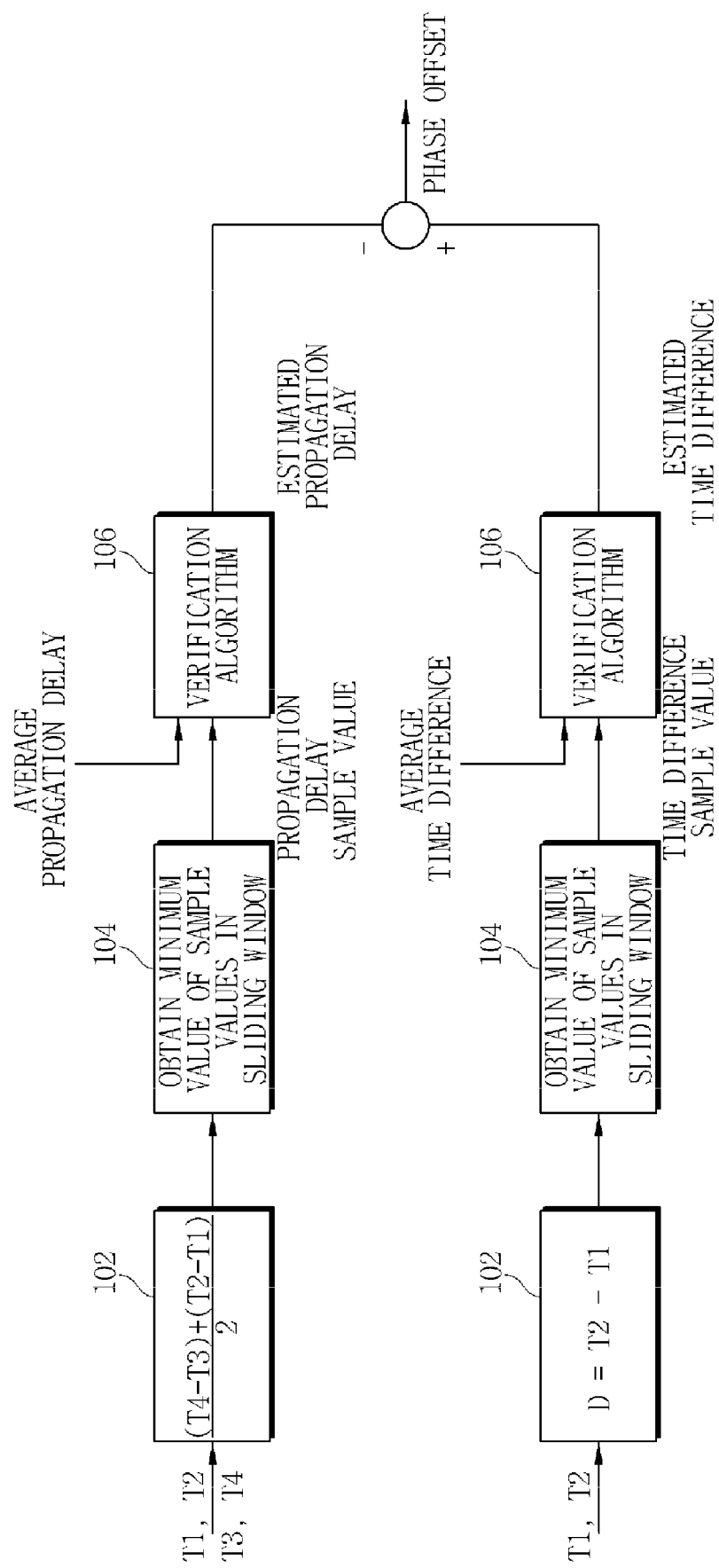

SYNCHRONIZING APPARATUS AND METHOD IN PACKET NETWORK

TECHNICAL FIELD

The following description relates to network synchronization, and more particularly, to a synchronizing apparatus and method in a packet network.

BACKGROUND

Various protocols, such as the Network Time Protocol (NTP) standard, which transmit timings using time stamps, have been developed. In these protocols, each slave device generally uses a local free-running clock signal, and tries to synchronize the local free-running clock signal with a clock signal of a master device (for example, an IEEE 1588 grand master) when the slave device is connected to the master device.

In general, when the slave device tries to synchronize with the master device, the slave device transmits to the master device a transmission message including a time stamp T1 regarding a transmission time. The master device receives the transmission message and transmits a response message to the slave device. This message transmission method may be referred to as a two-way message scheme. The response message includes a time stamp T2 regarding a time at which the master device has received the transmission message, and a time stamp T3 regarding a time at which the master device has sent the response message. A time stamp T4 regarding a time at which the slave device receives the response message also is used for synchronization. The slave device measures propagation delay using the time stamps T1 through T4, and synchronizes with the master device by subtracting the propagation delay from T3. In IEEE 1588, separate messages may be used for synchronization and propagation delay measurement.

Where network delay is symmetrical, delay in a downlink may equal to delay in an uplink, and accordingly, propagation delay and phase offset between the slave device and the master device may be obtained by the following Equations 1 and 2, respectively.

$$\text{propagation delay} = \frac{(T4 - T3) + (T2 - T1)}{2} \quad (1)$$

$$\text{offset from master} = \quad (2)$$
$$T4 - T3 - (\text{propagation delay}) = \frac{(T4 - T3) - (T2 - T1)}{2}$$

Here, propagation delay calculated by the Equation 1 is an average value of delay times in both the downlink and uplink.

However, in an actual network, since network delay is asymmetrical, actual propagation delay in an uplink may be different from actual propagation delay in a downlink. Accordingly, in the case of an asymmetrical network, an offset value calculated by the Equation 2 between a master device and a slave device may be different from an actual offset value.

Where a master device is directly connected to a slave device not via any internode, propagation delay may correspond to a sum of a delay time by a transmission physical layer (PHY), a delay time by a cable, and a delay time by a reception physical layer (PHY). Since the delay times may be very stable and a time offset between the master device and the slave device appears as static time errors, the delay times may not increase delay variation values, such as jitter or wander.

However, in an actual network, where a slave device is connected to a master device via at least one bridge or routers that cannot process timestamp messages, time stamp messages that are transmitted by the master or slave device will be subjected to queuing delay which may randomly change over time, that is, according to traffic loads or traffic characteristics. In this case, the queuing delay may vary by several ms, which may not satisfy the requirements regarding delay variation, such as jitter or wander, which may be required by general applications, such as timing control of a wireless base station, transmission of non-compressed digital video and audio, etc.

While messages including time stamps at an internode of a network may be transmitted first, since bridges and routers generally use a priority mechanism based on a non-preemptive scheduling scheme, the messages that contain the timestamps may be delayed due to packets that are currently being serviced. As a result, in this case, delay variation may still occur in units of hundreds of µs.

SUMMARY

According to an aspect, there is provided a synchronizing apparatus and method that performs synchronization in consideration of delay variation caused by network traffic in a packet network.

According to another aspect, there is provided a synchronizing apparatus for use in a packet network, comprising a sampling unit to measure a time difference using a plurality of time stamps included in a plurality of two-way message packets, an estimating unit to estimate a frequency offset by applying a baseline algorithm to the time difference, a verifying unit to verify the frequency offset to remove an error caused by network delay variation, and a synchronizing unit to remove the frequency offset from a local slave clock signal and generate a slave clock signal synchronized to a clock signal of a master device.

The estimating unit may form a baseline using points corresponding to non-delayed messages among the time difference, and determine a slope of the baseline as the frequency offset.

The estimating unit may form the baseline using the points corresponding to the non-delayed messages by applying a Convex Hull method to the time difference.

The verifying unit may maintain an average frequency offset using a sliding window having a predetermined size, and re-calculate an average frequency offset where a new frequency offset sample value is added to the sliding window.

The verifying unit may obtain an error value by calculating a difference between the new frequency offset sample value and the average frequency offset where the new frequency offset sample value is received, determine that the new frequency offset sample value is valid where the error value is less than a first threshold value, increase an error count value where the error value is equal to or greater than the first threshold value, discard the new frequency offset sample value where the error count value is less than a second threshold value, and initialize the sliding window where the error count value is equal to or greater than the second threshold value.

According to still another aspect, there is provided a synchronizing apparatus for use in a packet network, comprising a sampling unit to measure a time difference from a plurality of timestamps included in a plurality of two-way message packets, an estimating unit to estimate a propagation delay and a time difference by applying a baseline algorithm to the measured time difference, a verifying unit to verify the estimated propagation delay and the estimated time difference to remove an error caused by network delay variation, and a synchronizing unit to obtain a phase offset by calculating a difference between the verified time difference and the verified propagation delay, and remove the phase offset from a local slave clock signal to generate a slave clock signal synchronized to a clock signal of a master device.

The estimating unit may obtain a minimum value of the propagation delay and a minimum value of a time difference for a sliding window among the measured time difference, and determine the minimum value of the propagation delay and the minimum value of the time difference as the estimated propagation delay and the estimated time difference, respectively.

The verifying unit may maintain an average propagation delay or an average time difference, using a sliding window having a predetermined size, and re-calculates an average propagation delay or an average time difference where a new propagation delay sample value or a new time difference sample value is added to the sliding window.

The verifying unit may obtain an error value by calculating a difference between the new propagation delay sample value and the average propagation delay difference or a difference between the new time difference sample value and the average time difference value, where the new propagation delay sample value or the new time difference sample value is received, determine that the new propagation delay sample value or the new time difference sample value is valid where the error value is less than a first threshold value, increase an error count value where the error value is equal to or greater than the first threshold value, discard the new propagation sample value or the new time difference sample value where the error count value is less than a second threshold value, and initialize the sliding window where the error count value is equal to or greater than the second threshold value.

According to yet another aspect, there is provided a synchronizing method in a packet network, comprising measuring a time difference from a plurality of timestamps included in a plurality of two-way message packets where the two-way message packets are transmitted, measuring a frequency offset by applying a baseline algorithm to the measured time difference, verifying the frequency offset to remove an error caused by network delay variation, and removing the verified frequency offset from a local slave clock signal and generating a slave clock signal synchronized to a clock signal of a master device.

The measuring of the time difference may comprise measuring the time difference from the time stamps included in the two-way message packets whenever the two-way message packets are transmitted.

The verifying of the frequency offset may comprise, where a new frequency offset sample value is received, obtaining an error value by calculating a difference between the new frequency offset sample value and an average frequency offset, where the error value is less than a first threshold value, determining that the new frequency offset sample value is valid and updating the average frequency offset using a sliding window, where the error value is equal to or greater than the first threshold value, increasing an error count value and ignoring the new frequency offset sample, and where the error count value is equal to or greater than a second threshold value, initializing the sliding window.

According to still yet another aspect, there is provided a synchronizing method in a packet network, comprising measuring a time difference from a plurality of timestamps included in a plurality of two-way messages where the two-way messages are transmitted, estimating a propagation delay and a time difference by applying a baseline algorithm to the measured time difference, verifying the estimated propagation delay and the estimated time difference to remove an error caused by network delay variation, and calculating a difference between the verified time difference and the verified propagation delay to obtain a phase offset, removing the phase offset from a local slave clock signal, and generating a slave clock signal synchronized to a clock signal of a master device.

The measuring of the time difference may comprise measuring the time difference from the time stamps included in the two-way message packets whenever the two-way message packets are transmitted.

The verifying of the estimated propagation delay and the estimated time difference may comprise, where a new propagation delay sample value or a new time difference sample value is received, obtaining an error value by calculating a difference between the new propagation delay sample value and an average propagation delay or a difference between the new time difference sample value and an average time difference, where the error value is less than a first threshold value, determining that the new propagation delay sample value or the new time difference sample value is valid and determining a new average propagation delay using a sliding window or a new time difference using the sliding window, where the error value is equal to or greater than the first threshold value, increasing an error count value and ignoring the new sample value, where the error count value is less than a second threshold value, discarding the new propagation delay sample value or the new time difference sample value, and where the error count value is equal to or greater than the second threshold value, initializing the sliding window.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 7 is a block diagram illustrating a propagation delay and phase offset synchronizing method according to an exemplary embodiment.

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

A baseline algorithm used in an exemplary embodiment will be described, followed by the configuration and operation of a synchronizing apparatus according to an exemplary embodiment.

Figure 1:
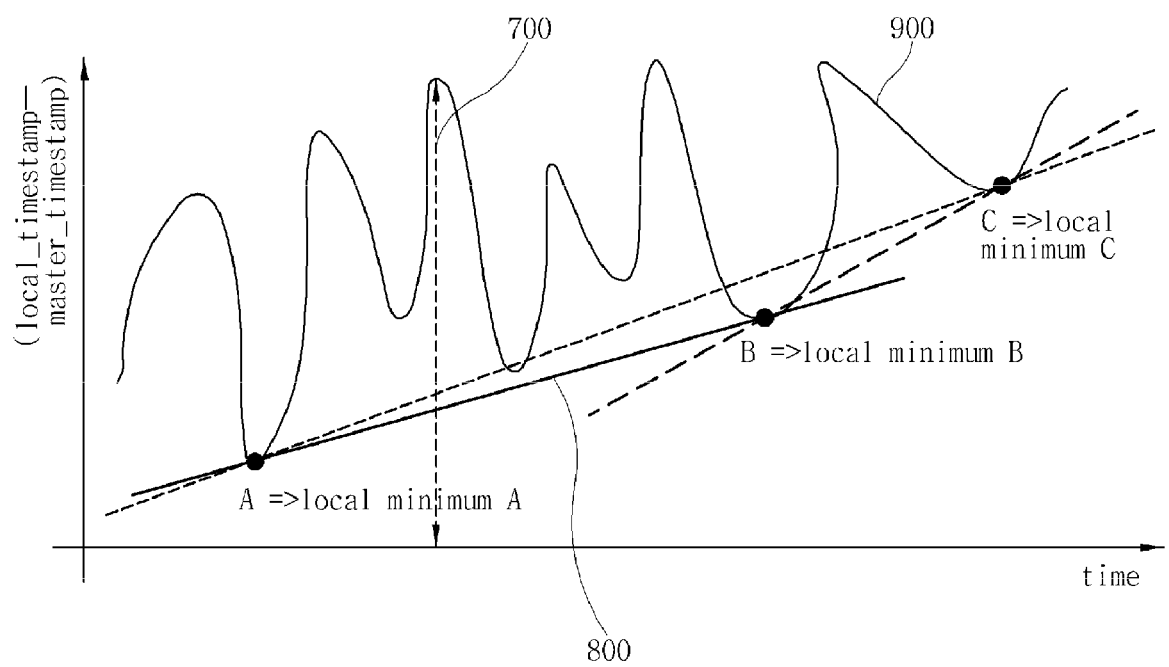
FIG. 1 is a graph for explaining a baseline algorithm.

FIG. 1 shows a graph for explaining a baseline algorithm.

FIG. 1 is a graph plotting delay with respect to time where a baseline algorithm is used to estimate a frequency offset between two network nodes in the case where delay variation occurs due to network traffic. Transmitting and receiving nodes record time stamps in a message, and the receiving node may obtain a delay time (an apparent delay) by subtracting a transmission time T1 from a reception time T2.

Where no network delay occurs, a delay time function at the receiving node may be obtained in the form of a linear function with respect to time. In FIG. 1, the slope of a baseline 800 may correspond to a frequency offset between transmitting and receiving terminals. A difference between apparent delay and true delay at an arbitrary time may correspond to a phase offset between the transmitting and receiving terminals at the arbitrary time.

Where network delay occurs, a delay time function at the receiving node may have an additional factor regarding delay variation. However, since delay variation is generally faster than phase variation due to a frequency offset, the baseline 800 approximating a linear function, which may be obtained where no delay variation occurs, may be obtained using a real delay function 900.

Referring to FIG. 1, an x axis represents a receiving time, and a y axis represents a delay time T2-T1. The baseline 800 may be obtained by connecting relative minimum values among time difference samples included in a sliding window. Accordingly, values forming the baseline 800 are lower than all local minimums (for example, A, B, C, etc.) so that the distances from the baseline 800 to the local minimums are minimized. A delay time 700 at an arbitrary time may equal to a sum of a propagation delay time and a phase offset (see Equation 2).

The baseline algorithm is generally used for one-way delay measurement, and defines a frequency offset and a delay time (that is, a sum of a phase offset and a propagation delay time). Accordingly, time synchronization may be performed by correcting a frequency offset.

According to an exemplary embodiment, a method of performing time synchronization comprises correcting both a frequency offset and a phase offset to synchronize a clock signal of a receiving node exactly to a clock signal of a transmitting node. It this case, it may be important to separately decide a phase offset and a propagation delay time. In order to separately decide a phase offset and a propagation delay time, a time synchronizing apparatus and method according to an exemplary embodiment may apply the above-described baseline algorithm to a two-way message scheme using the Equations 1 and 2.

Where the amount of network traffic load is in an allowable range, the baseline algorithm may obtain correct estimated values of a frequency offset and a phase offset. However, as the amount of network traffic load increases excessively, the accuracy of the frequency and phase offsets may be lowered. This is because the accuracy of the baseline algorithm may depend on whether or not the number of messages not delayed is sufficient. For example, points A, B, and C in FIG. 1 may correspond to such messages not delayed form a baseline. Where the network traffic increases excessively, the points which are not delayed may become insufficient to form a correct baseline.

Where a large error is generated momentarily at an estimated frequency, the error may appear as spikes in a graph in which estimated frequencies are drawn with respect to time. Momentary errors appearing in the estimated values of a phase offset and propagation delay may be caused by delay variation. Such errors may increase gradually with elapsed time. These errors caused by the delay variation reduce synchronization accuracy between a slave device and a master device.

Accordingly, a synchronizing apparatus and method according to an exemplary embodiment separately decides a frequency offset, propagation delay, and a time difference by applying the baseline algorithm to the two-way message scheme. This may raise the synchronization accuracy. Here, the phase offset may be calculated by obtaining the difference between the time difference and the propagation delay.

Also, the synchronizing apparatus and method may utilize a verification algorithm to verify the estimated values of the frequency offset, propagation delay, and time difference. This in turn may remove errors caused by network delay variation. In this case, the phase offset may be obtained by subtracting the verified estimated value of the propagation delay from the estimated value of the time difference (see Equation 2).

Figure 2:
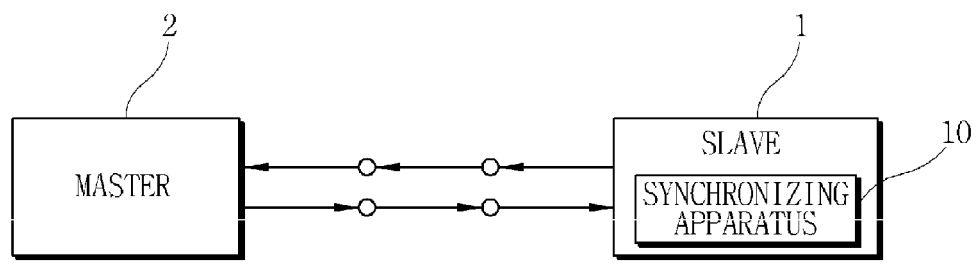
FIG. 2 is a configuration diagram of a synchronizing apparatus according to an exemplary embodiment.

FIG. 2 shows a synchronizing apparatus according to an exemplary embodiment.

Referring to FIG. 2, a slave device 1 and a master device 2 exist in a packet network. The slave device 1 includes a synchronizing apparatus 10 for estimating a frequency offset and a phase offset and performing time synchronization.

The packet network includes a plurality of links constructing a plurality of internodes. Each internode may be a bridge, switch or router. Messages including time stamps, which are transmitted by the master device 2 or the slave device 1, are subjected to queuing delay depending on traffic loads or traffic characteristics which may vary randomly with elapsed time.

According to an aspect, a frequency offset and phase offset may be estimated and adjusted to correctly perform time synchronization. By using a method of estimating a frequency offset and phase offset, according to an exemplary embodiment, correct time synchronization may be possible.

Figure 3:
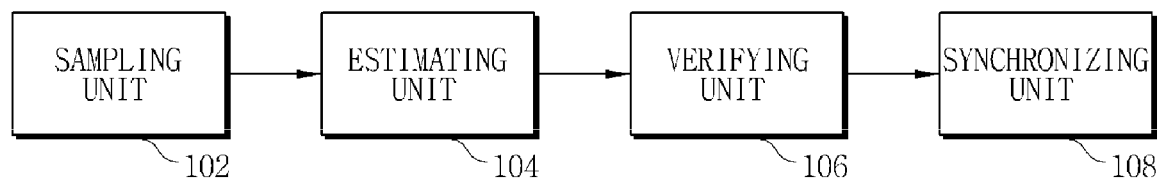
FIG. 3 is a block diagram of a synchronizing apparatus according to an exemplary embodiment.

FIG. 3 shows a synchronizing apparatus 10 according to an exemplary embodiment.

Referring to FIG. 3, the synchronizing apparatus 10 comprises a sampling unit 102, an estimating unit 104, a verifying unit 106, and a synchronizing unit 108.

The sampling unit 102 measures a time difference from time stamps included in two-way message packets.

The estimating unit 104 applies a baseline algorithm to the time difference measured by the sampling unit 102, thereby estimating a frequency offset. Here, the estimating unit 104 may form a baseline using points corresponding to non-delayed messages among the measured time difference, and determine the slope of the baseline as a frequency offset. For example, the estimating unit 104 applies a Convex Hull method to the measured time difference, thereby forming a baseline using points corresponding to non-delayed messages. The estimation unit 104 applies the baseline algorithm to the measured time difference, thereby estimating propagation delay and a time difference. The estimating unit 104 obtains a minimum value of propagation delay and a minimum value of a time difference for a sliding window, using the time difference measured by the sampling unit 102, and determines the minimum value of the propagation delay as an estimated propagation delay value, and the minimum value of the time difference as an estimated time difference.

The verifying unit 106 verifies the estimated frequency offset to remove errors caused by network delay variation. Also, the verifying unit 106 verifies the estimated propagation delay value and the estimated time difference in order to remove errors caused by network delay variation. The verifying unit 106 maintains an average frequency offset using a sliding window having a predetermined size, and recalculates an average frequency offset where a new frequency offset sample value is received.

Where a new frequency offset sample value is received, the verifying unit 106 obtains an error value by calculating the absolute value of the difference between the new frequency offset sample value and the average frequency offset, determines that the new frequency offset sample value is valid where the error value is lower than a first threshold value, increases an error count value where the error value is equal to or greater than the first threshold value, then discards the new frequency offset sample value without any verification where the error count value is lower than a second threshold value, and initializes the sliding window and resets the error count value to "0" where the error count value is equal to or greater than the second threshold value.

The synchronizing unit 108 removes the frequency offset from a local slave clock signal, and generates a slave clock signal frequency synchronized to a clock signal of the master device 2 (see FIG. 2). Also, the synchronizing unit 108 may obtain a phase offset by calculating a difference between the verified time difference and the verified propagation delay, remove the phase offset from the local slave clock signal, and generate a slave clock signal which is synchronized to the clock signal of the master device 2. Also, the synchronizing unit 108 may remove the frequency offset and phase offset from the local slave clock signal, thereby generating a slave clock signal which is synchronized to the clock signal of the master device 2.

Accordingly, by applying a baseline algorithm to a two-way message structure to separately estimate a frequency offset, propagation delay, and a time difference, applying a verification algorithm to the estimated values to verify the estimated values in order to remove errors caused by network delay variation from the estimated values, calculating a difference between the verified time difference and the verified propagation delay to obtain a phase offset, and adjusting the verified frequency offset and phase offset to adjust a local slave clock signal, correct time synchronization may be performed regardless of network delay variation.

Figure 4:
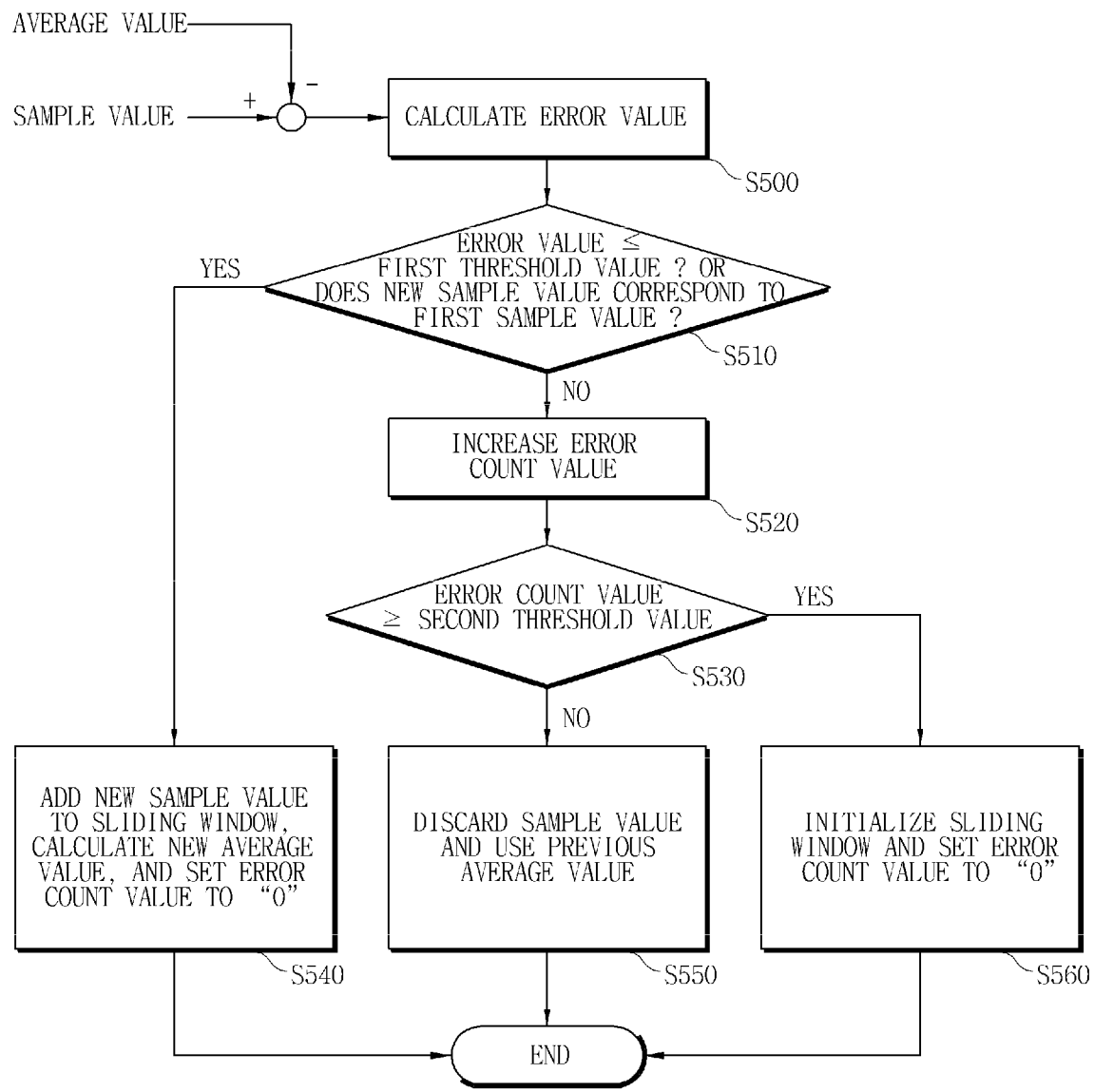
FIG. 4 is a flowchart showing an operation of a verifying unit according to an exemplary embodiment.

FIG. 4 shows a flowchart of an operation of the verifying unit 106 according to an exemplary embodiment.

Referring to FIG. 4, the verifying unit 106 maintains a sliding window having a predetermined size W. The verifying unit 106 receives the estimated values of a frequency offset, a time difference, and propagation delay, which are most recently verified. Also, the sliding window maintains the average value of each verified estimated value. Where a new sample value is added to the sliding window, each average value is re-calculated. Where a verified estimated value is added to the sliding window, the most previously (i.e., the oldest) verified estimated value is discarded from the sliding window where the sliding window is full (that is, where W estimated values exist in the sliding window).

In the case where a new non-verified sample value is input to the sliding window of the verifying unit 106, the absolute value of the difference between the new sample value and a current average value is obtained, so that an error value caused by network delay variation is calculated (operation S500).

Where the new sample value is a sample value which is first input to the sliding window, or where the error value is less than a first threshold value (operation S510), the new sample value is added to the sliding window, thus a new average value is calculated, and the new sample value is verified as a current estimated value (operation S540). Also, an error count value is reset to "0".

Where the error value is equal to or greater than the first threshold value, and where the new sample value is not a sample value which is first input to the sliding window (operation S510), an error count value increases (operation S520), and the error count value is compared with a second threshold value (operation S530). Where the error count value is less than the second threshold value, the new sample value is discarded without any verification (operation S550). The previously verified estimated value is maintained as a current estimated value until a next sample value is verified.

Where the error count value is equal to or greater than the second threshold value, it is determined that the estimated values have changed, and the sliding window is initialized. That is, the current sample values in the sliding window are all discarded (operation S560). Also, the error count value is reset to "0".

According to an aspect, where a new sample value is measured, the verifying unit 106 verifies the validity of the new sample value where an error value is less than a first threshold value (operation S540). Where the error value is equal to or greater than the first threshold value, an error count value increases. Where the error count value is less than a second threshold value, it is determined that an error is generated due to network delay variation, and only the new sample value is discarded (operation S550). Where the error count value is equal to or greater than the second threshold value, it is determined that a baseline is changed by various other causes, not by an accidental error due to network delay variation, like a straight line BC shown in FIG. 1, and the sliding window is initialized (operation S560).

Figure 5A:
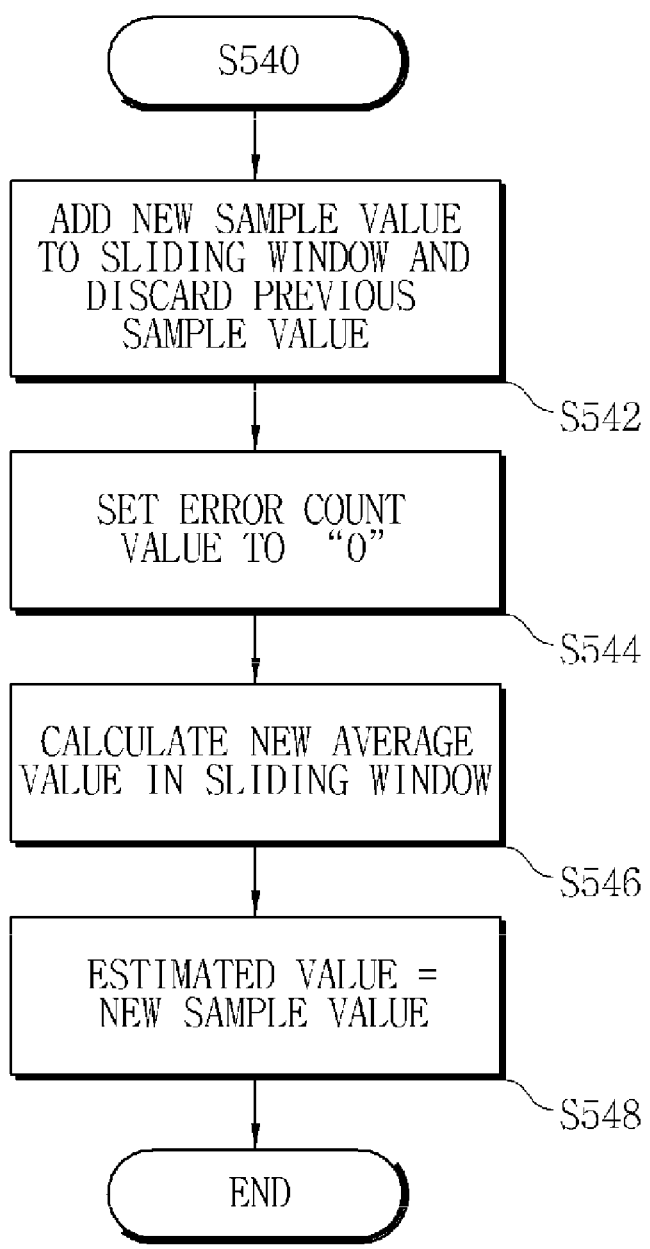
FIGS. 5A through 5C are flowcharts regarding operations of the flowchart shown in FIG. 4.
Figure 5B:
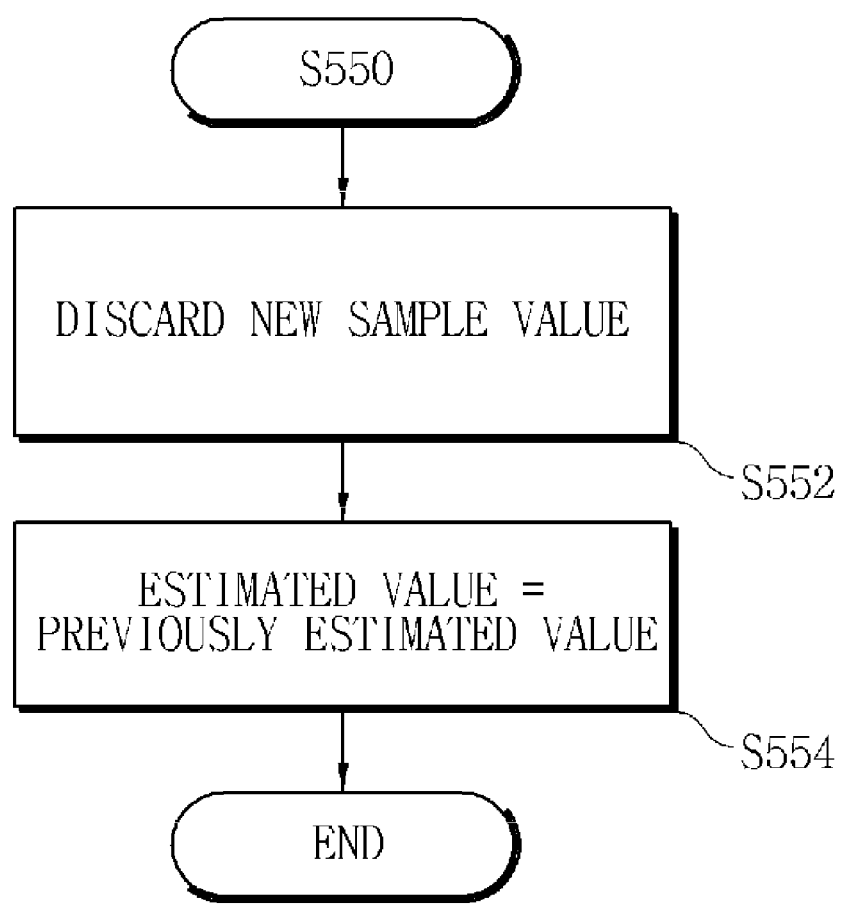
Figure 5C:
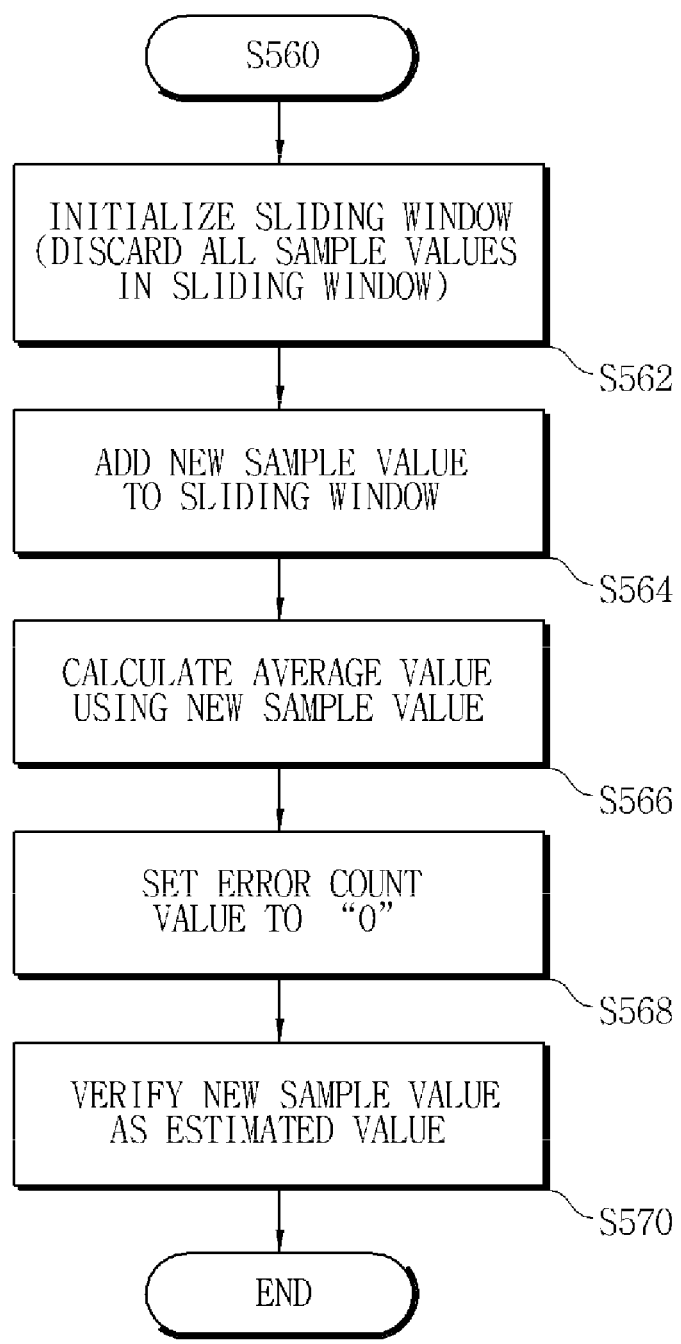

FIGS. 5A through 5C shows flowcharts regarding the operations of the flowchart shown in FIG. 4 in additional detail, wherein the operations are performed by the verifying unit 106 of FIG. 3 according to an exemplary embodiment.

Referring to FIG. 5A, where an error value is less than a first threshold value, a new sample value is added to a sliding window and the most previously verified sample value is discarded (operation S542). An error count value is reset to "0" (operation S544), and a new average value is calculated in the sliding window (operation S546). The average value is used to calculate an error value. Then, the new sample value is verified as a current estimated value (operation S548).

Referring to FIG. 5B, where the error value is equal to or greater than the first threshold value and an error count value is less than a second threshold value, it is determined that an error is generated due to network delay variation, and the new sample value is discarded (operation S552). The previously estimated value is maintained as it is (operation S554).

Referring to FIG. 5C, where the error value is equal to or greater than the first threshold value and the error count value is equal to or greater than the second threshold value, it is determined that a baseline is changed by various other causes, not by an accidental error due to network delay variation, and the sliding window is initialized (operation S562). The new sample value is added to the sliding window (operation S564), an average value is re-calculated using the new sample value (operation S566), and the error count value is reset to "0" (operation S568). Then, the new sample value is verified as a current estimated value (operation S570).

By utilizing the exemplary verification algorithm described above, it may be possible to remove momentary errors caused by network delay variation, to correctly form a baseline using non-delayed messages, and to thus raise the accuracy of time synchronization.

Figure 6:
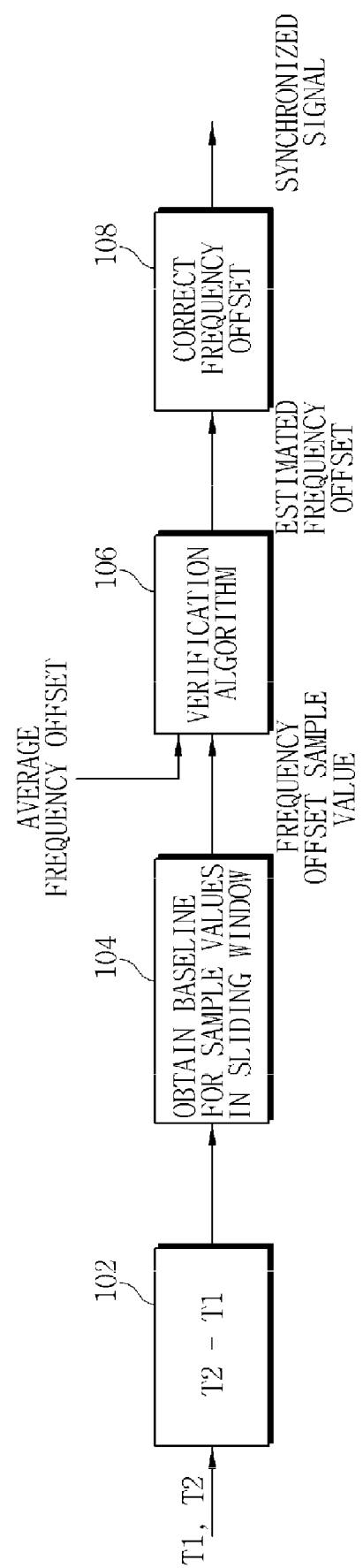
FIG. 6 is a block diagram illustrating a frequency offset synchronizing method using a verification algorithm, according to an exemplary embodiment.

FIG. 6 illustrates a frequency offset synchronization method using a verification algorithm, according to an exemplary embodiment.

Referring to FIGS. 3 and 6, the sampling unit 102 measures a time difference T2-T1 from time stamps included in two-way message packets, for example, whenever the two-way messages are transmitted. The estimating unit 104 applies a baseline algorithm to the time difference T2-T1 measured by the sampling unit 102, thereby estimating a frequency offset. Here, the estimating unit 104 forms a baseline using points corresponding to non-delayed messages, among the measured time difference T2-T1, and determines the slope of the baseline as a frequency offset. The verifying unit 106 verifies the frequency offset in order to remove errors caused by network delay variation. That is, the verifying unit 106 compares an error value with a first threshold value and compares an error count value with a second threshold value, respectively, wherein the error value is the difference between an average frequency offset in a sliding window and a newly measured frequency offset sample value, thereby verifying whether the measured sample value is valid. Details for a verification algorithm have been described above with reference to FIG. 5C. The synchronizing unit 108 corrects the verified estimated frequency offset using a local slave clock signal, and generates a clock signal frequency synchronized to a clock signal of a master device.

FIG. 7 illustrates a propagation delay and phase offset synchronizing method according to an exemplary embodiment.

Referring to FIGS. 3 and 7, the sampling unit 102 measures a propagation delay value $$\frac{(T4 - T3) + (T2 - T1)}{2}$$

using time stamps included in two-way message packets, whenever the two-way message packets are transmitted (see Equation 1). Samples that are successively measured are input to a sliding window having a predetermined size W. Where the sliding window already has W samples, the most previously verified sample is discarded. The estimating unit 104 may obtain a minimum value of sample values included in the sliding window. Propagation delay or a time difference may be obtained by an offset value obtained by, for example, a Convex Hull algorithm. The verifying unit 106 receives the propagation delay or the time difference, and compares the propagation delay or time difference with current average propagation delay or a current average time difference, thereby performing a verification algorithm. The synchronizing unit 106 obtains a phase offset by calculating a difference between the verified time difference and the verified propagation delay, and removes the phase offset from a local slave clock signal to thus generate a slave clock signal synchronized to a clock signal of a master device.

According to certain embodiments described above, by removing delay variation, such as jitter or wander, caused by a bridge, switch, or router located between a master device and a slave device in a packet network, effective synchronization between the master device and the slave device is possible. For example, by applying a baseline algorithm to a two-way message structure, removing momentary errors caused by network delay variation using a verification algorithm, and correctly forming a baseline using non-delayed messages, it is possible to raise the accuracy of time synchronization.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A synchronizing apparatus for use in a packet network, comprising:
    a sampling unit to measure a time difference using a plurality of time stamps included in a plurality of two-way message packets;
    an estimating unit to estimate a frequency offset by applying a baseline algorithm to the time difference;
    a verifying unit to verify the frequency offset to remove an error caused by network delay variation; and
    a synchronizing unit to remove the frequency offset from a local slave clock signal and generate a slave clock signal synchronized to a clock signal of a master device.

2. The synchronizing apparatus of claim 1, wherein the estimating unit forms a baseline using points corresponding to non-delayed messages among the time difference, and determines a slope of the baseline as the frequency offset.

3. The synchronizing apparatus of claim 2, wherein the estimating unit forms the baseline using the points corresponding to the non-delayed messages by applying a Convex hull method to the time difference.

4. The synchronizing apparatus of claim 1, wherein the verifying unit maintains an average frequency offset using a sliding window having a predetermined size, and re-calculates an average frequency offset where a new frequency offset sample value is added to the sliding window.

5. The synchronizing apparatus of claim 4, wherein the verifying unit obtains an error value by calculating a difference between the new frequency offset sample value and the average frequency offset where the new frequency offset sample value is received, determines that the new frequency offset sample value is valid where the error value is less than a first threshold value, increases an error count value where the error value is equal to or greater than the first threshold value, discards the new frequency offset sample value where the error count value is less than a second threshold value, and initializes the sliding window where the error count value is equal to or greater than the second threshold value.

6. A synchronizing apparatus for use in a packet network, comprising:
   a sampling unit to measure a time difference from a plurality of time stamps included in a plurality of two-way message packets;
   an estimating unit to estimate a propagation delay and a time difference by applying a baseline algorithm to the measured time difference;
   a verifying unit to verify the estimated propagation delay and the estimated time difference to remove an error caused by network delay variation; and
   a synchronizing unit to obtain a phase offset by calculating a difference between the verified time difference and the verified propagation delay, and remove the phase offset from a local slave clock signal to generate a slave clock signal synchronized to a clock signal of a master device.

7. The synchronizing apparatus of claim 6, wherein the estimating unit obtains a minimum value of the propagation delay and a minimum value of a time difference for a sliding window among the measured time difference, and determines the minimum value of the propagation delay and the minimum value of the time difference as the estimated propagation delay and the estimated time difference, respectively.

8. The synchronizing apparatus of claim 6, wherein the verifying unit maintains an average propagation delay or an average time difference, using a sliding window having a predetermined size, and re-calculates an average propagation delay or an average time difference where a new propagation delay sample value or a new time difference sample value is added to the sliding window.

9. The synchronizing apparatus of claim 8, wherein the verifying unit obtains an error value by calculating a difference between the new propagation delay sample value and the average propagation delay difference or a difference between the new time difference sample value and the average time difference value, where the new propagation delay sample value or the new time difference sample value is received, determines that the new propagation delay sample value or the new time difference sample value is valid where the error value is less than a first threshold value, increases an error count value where the error value is equal to or greater than the first threshold value, discards the new propagation sample value or the new time difference sample value where the error count value is less than a second threshold value, and initializes the sliding window where the error count value is equal to or greater than the second threshold value.

10. A synchronizing method in a packet network, the method comprising:
    measuring a time difference from a plurality of time stamps included in a plurality of two-way message packets where the two-way message packets are transmitted;
    measuring a frequency offset by applying a baseline algorithm to the measured time difference;
    verifying the frequency offset to remove an error caused by network delay variation; and
    removing the verified frequency offset from a local slave clock signal and generating a slave clock signal synchronized to a clock signal of a master device.

11. The synchronizing method of claim 10, wherein the verifying of the frequency offset comprises:
    where a new frequency offset sample value is received, obtaining an error value by calculating a difference between the new frequency offset sample value and an average frequency offset;
    where the error value is less than a first threshold value, determining that the new frequency offset sample value is valid and updating the average frequency offset using a sliding window;
    where the error value is equal to or greater than the first threshold value, increasing an error count value and ignoring the new frequency offset sample; and
    where the error count value is equal to or greater than a second threshold value, initializing the sliding window.

12. The synchronizing method of claim 10, wherein the measuring of the time difference comprises measuring the time difference from the time stamps included in the two-way message packets whenever the two-way message packets are transmitted.

13. A synchronizing method in a packet network, comprising:
    measuring a time difference from a plurality of time stamps included in a plurality of two-way messages where the two-way messages are transmitted;
    estimating a propagation delay and a time difference by applying a baseline algorithm to the measured time difference;
    verifying the estimated propagation delay and the estimated time difference to remove an error caused by network delay variation; and
    calculating a difference between the verified time difference and the verified propagation delay to obtain a phase offset, removing the phase offset from a local slave clock signal, and generating a slave clock signal synchronized to a clock signal of a master device.

14. The synchronizing method of claim 13, wherein the verifying of the estimated propagation delay and the estimated time difference comprises:
    where a new propagation delay sample value or a new time difference sample value is received, obtaining an error value by calculating a difference between the new propagation delay sample value and an average propagation delay or a difference between the new time difference sample value and an average time difference;
    where the error value is less than a first threshold value, determining that the new propagation delay sample value or the new time difference sample value is valid and determining a new average propagation delay using a sliding window or a new time difference using the sliding window;
    where the error value is equal to or greater than the first threshold value, increasing an error count value and ignoring the new sample value;
    where the error count value is less than a second threshold value, discarding the new propagation delay sample value or the new time difference sample value; and
    where the error count value is equal to or greater than the second threshold value, initializing the sliding window.

15. The synchronizing method of claim 13, wherein the measuring of the time difference comprises measuring the time difference from the time stamps included in the two-way message packets whenever the two-way message packets are transmitted.

* * * * *